US012561718B1

(12) United States Patent
Thomas et al.

(10) Patent No.: US 12,561,718 B1
(45) Date of Patent: Feb. 24, 2026

(54) SYSTEMS AND METHODS FOR DIGITAL DATA VALUATION

(71) Applicant: United Services Automobile Association (USAA), San Antonio, TX (US)

(72) Inventors: Anto Chirayil Thomas, Coppell, TX (US); Subhalakshmi Selvam, Allen, TX (US); Charlotte Thomas Creech, San Antonio, TX (US); Nathan Lee Post, Rockport, TX (US); Mathew Cyriac Kottoor, San Antonio, TX (US); Nina Cooper, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 286 days.

(21) Appl. No.: 18/072,250

(22) Filed: Nov. 30, 2022

Related U.S. Application Data

(60) Provisional application No. 63/284,466, filed on Nov. 30, 2021.

(51) Int. Cl.
| | |
|---|---|
| *G06Q 30/02* | (2023.01) |
| *G06F 16/28* | (2019.01) |
| *G06F 16/951* | (2019.01) |

(52) U.S. Cl.
CPC ....... *G06Q 30/0278* (2013.01); *G06F 16/285* (2019.01); *G06F 16/951* (2019.01)

(58) Field of Classification Search
CPC .. G06Q 30/0278; G06F 16/285; G06F 16/951
See application file for complete search history.

(56) References Cited

U.S. PATENT DOCUMENTS

| | | | | |
|---|---|---|---|---|
| 2002/0194161 | A1* | 12/2002 | McNamee | .......... G06F 16/9532 |
| 2006/0015744 | A1* | 1/2006 | Masuzawa | .............. G06F 21/57 |
| | | | | 713/182 |
| 2011/0246261 | A1* | 10/2011 | Kassaei | ................ G06Q 10/067 |
| | | | | 705/348 |
| 2016/0239665 | A1* | 8/2016 | Hamby | ................. G06F 21/577 |
| 2017/0206604 | A1* | 7/2017 | Al-Masoud | ............ G06Q 40/08 |

* cited by examiner

*Primary Examiner* — Khanh B Pham
*Assistant Examiner* — Brooks T Hale
(74) *Attorney, Agent, or Firm* — Fletcher Yoder, P.C.

(57) ABSTRACT

Techniques provided herein employ a data crawler to sort through data stored on an electronic device to enable classification of data based on certain characteristics. For example, the data crawler can assess data characteristics such as rarity, originality, frequency of access, level of customization and level of security to help determine the value of data for indemnification purposes. Such characterizations may be used alongside a device security assessment to determine the data loss insurance premium and/or coverage.

20 Claims, 7 Drawing Sheets

200

202
Identify and Access Covered Data Storage Device

204
Identify Tangential Data Sources Associated with Data Stored On the Data Storage Device 206
Crawl Data Storage Device and Data Sources to Identify Value-Relevant Characteristics of the Data Stored on the Data Storage Device 208
Provide Data Characteristics for Subsequent Valuation of Data

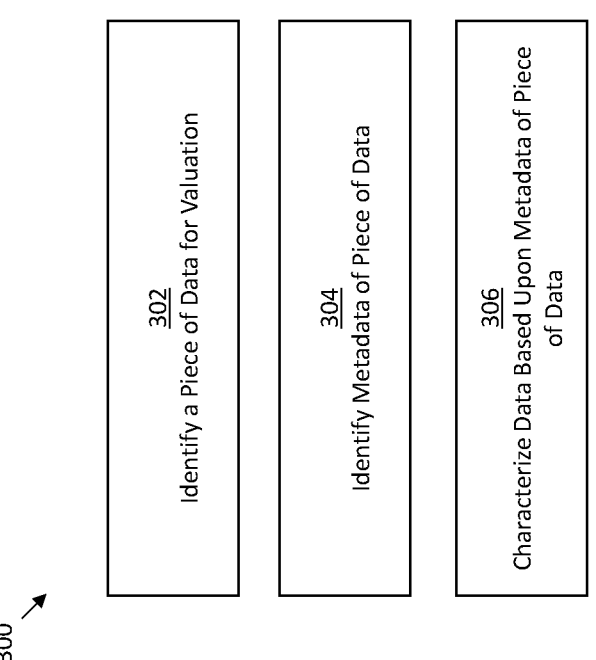

300

302
Identify a Piece of Data for Valuation

304
Identify Metadata of Piece of Data

306
Characterize Data Based Upon Metadata of Piece of Data

FIG. 3

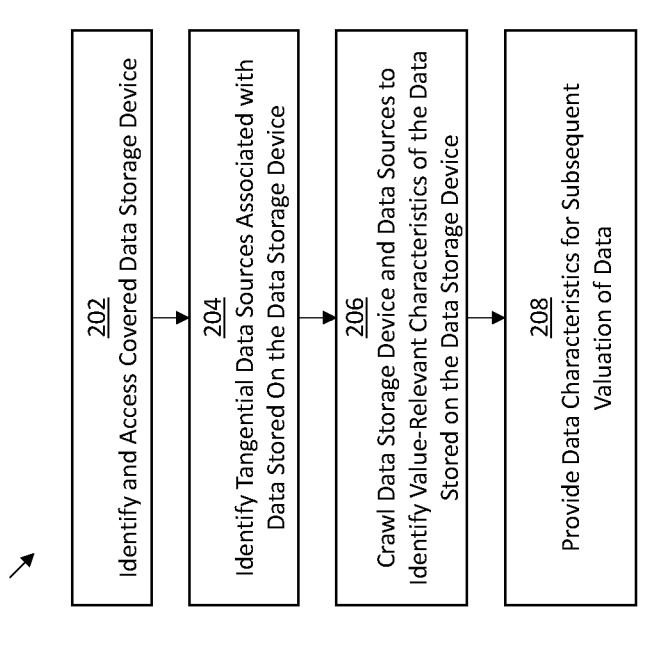

200

202
Identify and Access Covered Data Storage Device

204
Identify Tangential Data Sources Associated with Data Stored On the Data Storage Device 206
Crawl Data Storage Device and Data Sources to Identify Value-Relevant Characteristics of the Data Stored on the Data Storage Device 208
Provide Data Characteristics for Subsequent Valuation of Data

FIG. 2

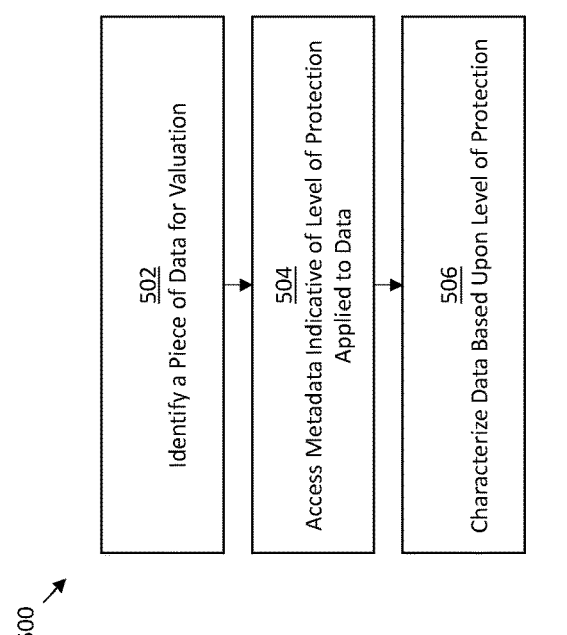

502
Identify a Piece of Data for Valuation

504
Access Metadata Indicative of Level of Protection Applied to Data

506
Characterize Data Based Upon Level of Protection

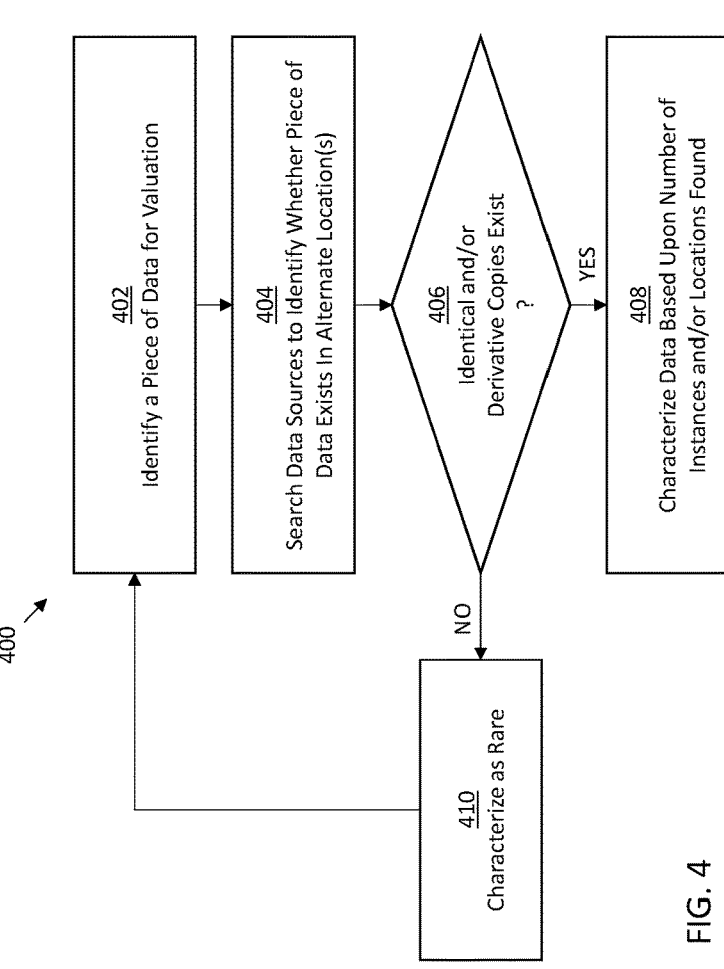

402
Identify a Piece of Data for Valuation

404
Search Data Sources to Identify Whether Piece of Data Exists In Alternate Location(s)

406
Identical and/or Derivative Copies Exist ?

408
Characterize Data Based Upon Number of Instances and/or Locations Found

410
Characterize as Rare

YES

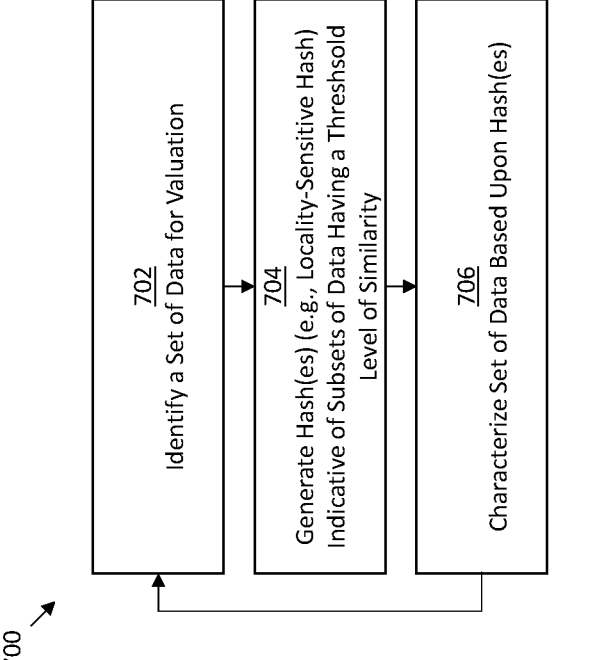

700

702
Identify a Set of Data for Valuation

704
Generate Hash(es) (e.g., Locality-Sensitive Hash) Indicative of Subsets of Data Having a Threshsold Level of Similarity 706
Characterize Set of Data Based Upon Hash(es)

FIG. 7

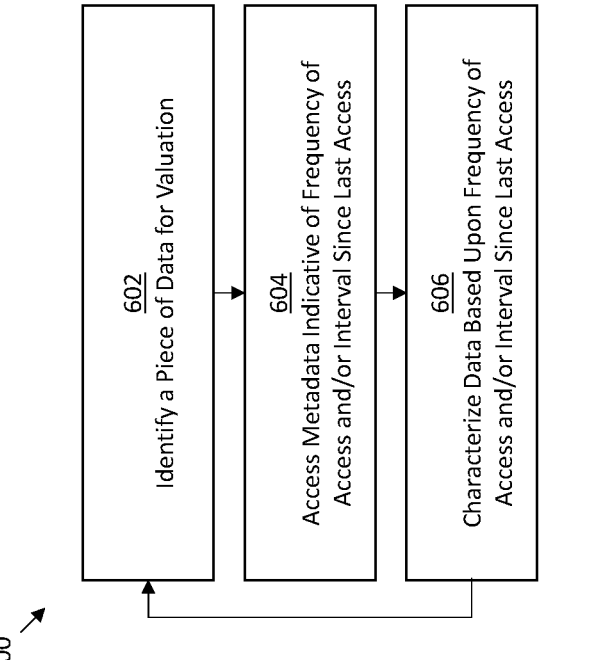

600

602
Identify a Piece of Data for Valuation

604
Access Metadata Indicative of Frequency of Access and/or Interval Since Last Access 606
Characterize Data Based Upon Frequency of Access and/or Interval Since Last Access

Figures 8, 9:
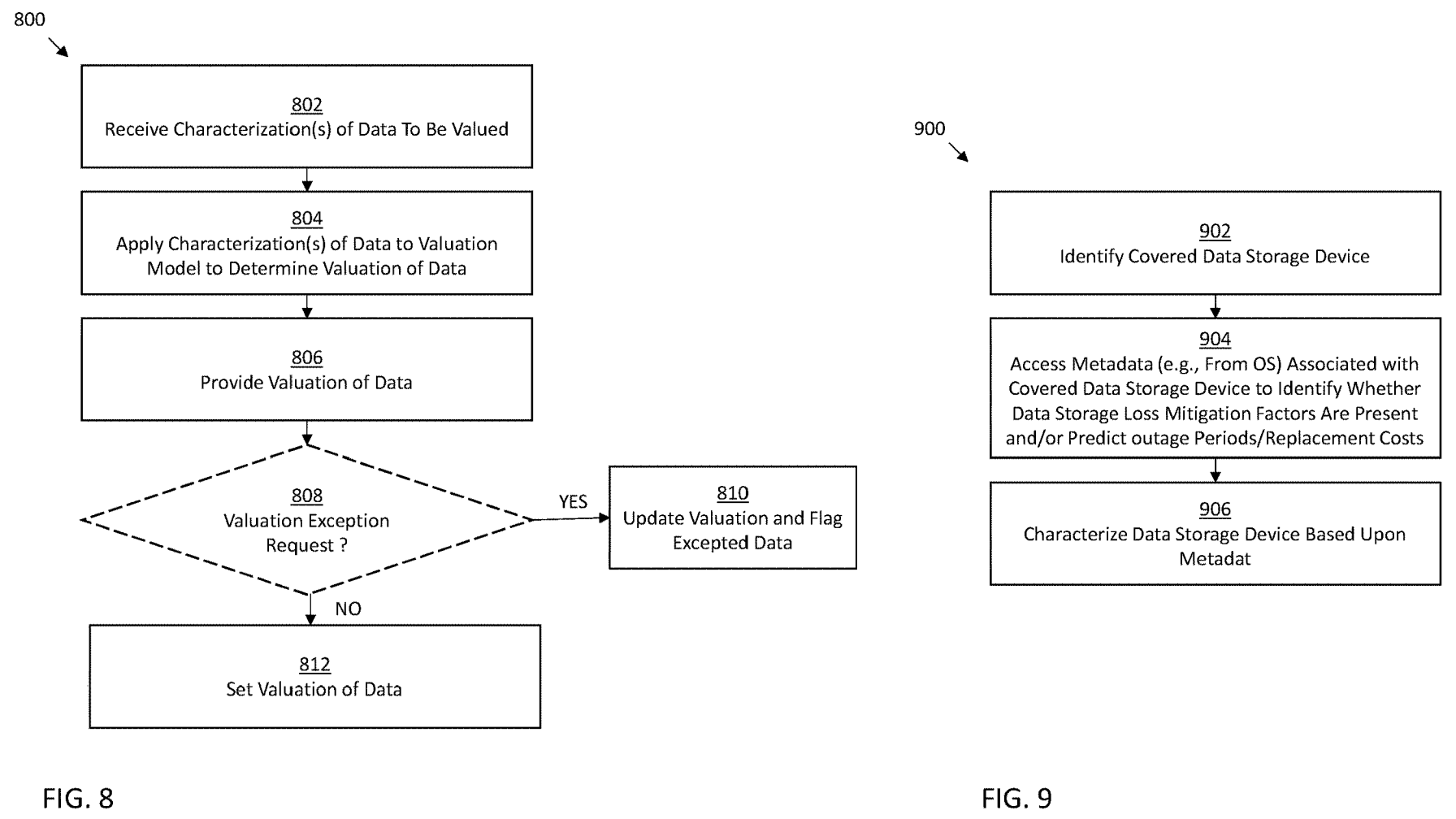

902
Identify Covered Data Storage Device

904
Access Metadata (e.g., From OS) Associated with Covered Data Storage Device to Identify Whether Data Storage Loss Mitigation Factors Are Present and/or Predict outage Periods/Replacement Costs

906
Characterize Data Storage Device Based Upon Metadat

802
Receive Characterization(s) of Data To Be Valued

804
Apply Characterization(s) of Data to Valuation Model to Determine Valuation of Data

806
Provide Valuation of Data

808
Valuation Exception Request ?

YES

810
Update Valuation and Flag Excepted Data

NO

812
Set Valuation of Data

1002
Receive Characterizations of Covered Data/Data to Be Covered

1004
Receive Characterization of Data Storage Device That is Covered/To Be Covered 1006
Identify Potential Risk of Loss and Potential Value of Loss 1008
Adjust Data Loss Premium Value Based Upon Potential Risk of Loss and Potential Value of Loss

SYSTEMS AND METHODS FOR DIGITAL DATA VALUATION

CROSS-REFERENCE TO RELATED APPLICATION

The present application claims benefit of and priority to U.S. Provisional Patent Application Ser. No. 63/284,466, titled "SYSTEMS AND METHODS FOR DIGITAL DATA VALUATION," which was filed on Nov. 30, 2021, and which is herein incorporated by reference in its entirety for all purposes.

BACKGROUND

The present disclosure is related generally to digital data valuation systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As the world becomes increasingly technologically advanced and more data-driven, the digital data becomes increasingly abundant and relied upon. At the same time, as computer storage becomes cheaper, the incentive to clear the digital storage of unimportant data diminishes. This results in valuable data being stored alongside less-important data and, in some cases, the same or similar data being stored in multiple locations simultaneously. For the purposes of data loss indemnification, this presents a data valuation challenge, as it may be difficult to distinguish more-important/ more-valuable data from less-important/less-valuable data. The techniques provided herein may be used to distinguish/ classify digital data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a flow chart, illustrating a general process of data characterization by the data crawler, in accordance with certain embodiments described herein;

FIG. 3 is a flow chart, illustrating a process of characterizing a piece of data based on its metadata, in accordance with certain embodiments described herein;

FIG. 4 is a flow chart, illustrating a process of characterizing a piece of data based on its rarity, in accordance with certain embodiments described herein;

FIG. 5 is a flow chart, illustrating a process of characterizing a piece of data based on its level of protection on the covered data storage device, in accordance with certain embodiments described herein;

FIG. 6 is a flow chart, illustrating a process of characterizing a piece of data based on the frequency with which it was accessed, in accordance with certain embodiments described herein;

FIG. 7 is a flow chart, illustrating a process of characterizing a set of data based on similarity of its content using hash functions, in accordance with certain embodiments described herein;

FIG. 8 is a flow chart, illustrating a process of valuing data based on its characterizations, in accordance with certain embodiments described herein;

FIG. 9 is a flow chart, illustrating a process of characterizing the data storage device based on its metadata, in accordance with certain embodiments described herein;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Techniques provided herein employ a data crawler to sort through data stored on a covered data storage device to enable identification and classification of data based on certain characteristics. For example, the data crawler can accumulate certain characteristics of the data that help determine the value of data (e.g., for indemnification purposes). To value data, the data crawler may be developed to index data according to specific features of the data. The data crawler could be tasked with identifying data characteristics such as how personalized the data is, how protected the data is relative to other data on a device, how often the data is accessed and how rare the data is. Such characterizations may be used alongside data security and fault tolerance information to determine the data loss insurance premiums and/or coverage.

As discussed herein, an autonomous function may be used to taxonomize data. The taxonomy may happen automatically for supervised training of target data ahead of time. Additional functionality can be supported by the use of unsupervised learning by utilizing clustering algorithms to create a relevant class or data persona and the behavioral usage. The usefulness allows for additional security measures based on the assessed value of the data in addition to an assessed value relevant to the usage of the data (e.g., multi resolution analytics).

Figure 1:
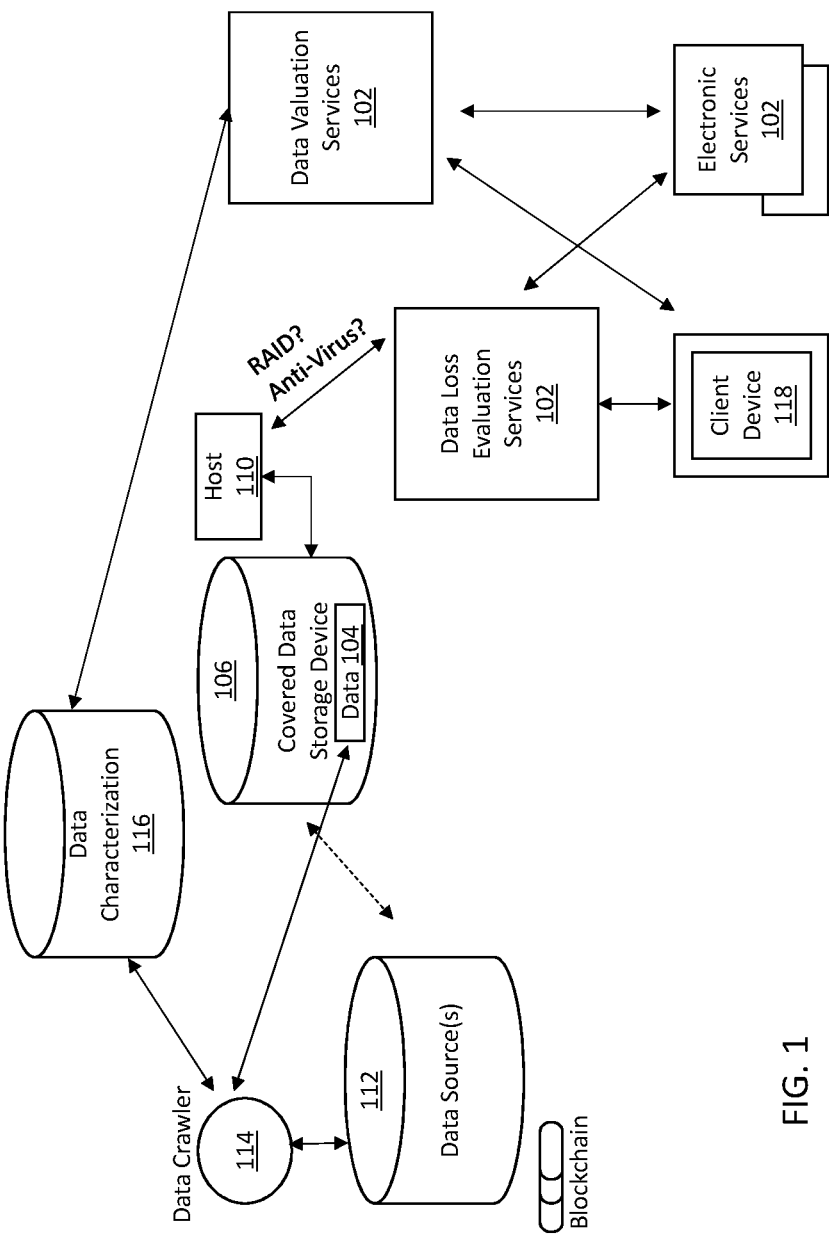
FIG. 1 is a schematic diagram of a data valuation system that determines the value and the likelihood of a loss of data saved on a covered data storage device, in accordance with certain embodiments described herein.

With the foregoing in mind, FIG. 1 is a schematic diagram of a data valuation system 100 that includes data valuation services 102 tasked with determining value of data 104 stored on a covered data storage device 106, according to certain embodiments described herein. The system may also include data loss evaluation services 108, which are tasked with identifying a likelihood of loss of data stored on the covered data storage device 106. As used herein, "covered data storage device" may refer to a data storage device that has been identified for monitoring by the data valuation services 102 and/or data loss evaluation services 108 (e.g., based upon a subscription payment, insurance payment, etc.)

As shown, the data 104 is stored on the covered data storage device 106 (e.g., a cell phone, a personal computer, etc.). In some embodiments, the covered data storage device 106 may be connected to a host 110, such as a web server, tasked with providing data access via a hosted service.

A data crawler 114, which may be a computer program or a mobile application, may access the data 104 to identify metadata pertaining to the data 104. This metadata and/or the data 104 content itself may be used to generate characterizations 114. These characterizations 114 may be stored in a data store and may be used to identify the value of the data 104.

The data 104 may be characterized based on several value-relevant characteristics including but not limited to data rarity, frequency of access, level of protection, level of originality, and level of customization. For instance, when relatively few copies and/or derivatives of a piece of data are found (e.g., in only one or a few locations on the covered data storage device 106 and/or externally to the data storage device 106) the piece of data may be classified as rare, increasing its value. On the other hand, when several copies and/or derivatives of such a piece of data is found (e.g., in one or several locations), the piece of data may be classified as less-rare, decreasing its value. For example, a clip art image may be characterized as low in originality, indicating that it is of lesser value. To determine whether a piece of data is original, the data crawler 114 may access data sources 112 in order to compare the piece of data against pre-existing data. To determine whether an image contains clip art, the data crawler 114 may compare the image against the contents of a clip art library/database to identify identical and/or significant matches to pre-existing content. The data sources 112 may include various types of conventional databases as well as blockchain databases.

The characterizations 116 of the data 104 may be used by data valuation services 102 to assign the data 104 a value (e.g., monetary value) based on the data's relative importance, retrievability after loss, etc. For example, the data valuation services 102 may use one or more machine learning models to derive value of data 104 based at least upon the data characterizations 116 of the data 104. The valuation of the data 104 is then provided to client devices 118 (e.g., via a graphical user interface (GUI) and/or to downstream electronic services 120, which may facilitate service offerings based upon the provided data 104 valuation.

Having discussed the data valuation process, the discussion now turns to data loss evaluation. As mentioned herein, evaluating the likelihood of a data loss may be desirable. Information technology (IT) features, such as the fault tolerance configurations of the covered data storage devices 106 and/or security levels and/or other security configurations of the data 104 also play an important role in determining a likelihood of data loss. The likelihood of data loss on a covered data storage device 106 may provide help in understanding a likelihood of indemnification after a data loss event, for example. Thus, the data loss evaluation services 108 may access the covered data storage device 106 and/or the host 110 connected to a covered data storage device 106 in order to determine how securely the data is stored. For example, the presence of antivirus software and/or password protection and/or encryption on the covered data storage device 106 and/or the distribution of the data 104 on a Redundant Array of Inexpensive Disks (RAID), may indicate that data is stored securely reducing the likelihood of data loss.

The value of the data from the data valuation services 102 and the likelihood of data loss data loss evaluation services 108 may be used in calculation of a premium and coverage amount of insuring the data 104. Such data coverage and premium information may be viewed on a client device 116 (e.g., via an app) or through associated electronic services (e.g., via a web browser).

Turning now to a more detailed discussion of the data characterization process, FIG. 2 is a flow chart illustrating a process 200 of data characterization, in accordance with certain embodiments described herein. The data characterization process 200 begins with the data crawler 114 identifying and accessing the covered data storage device 106 (block 202). This step may involve the data crawler 114 identifying the covered data storage device 106 based on its IP address, operating system, etc. The next step is to identify data sources 112 associated with data stored on the covered data storage device 106 (block 204). As mentioned earlier, such data sources 112 may be used to determine the level of rarity and/or originality of the data and may include blockchain databases or various types of traditional databases.

The data crawler 114 may then crawl the covered data storage device 106 and the data sources 112 to identify value-relevant characteristics of the data 104 stored on the covered data storage device 106 (block 206). As mentioned earlier, such value-relevant characteristics may include data rarity, frequency of access, level of protection, level of originality, and level of customization. This step may help identify value-relevant characteristics most applicable and/or suitable for a particular type of data. For example, as will be explained in more detail later, age may be a particularly important characteristic for certain photographic images.

Lastly, the data crawler 114 may provide the data characteristics for subsequent valuation of data (block 208). Based on the provided characteristics, corresponding metadata of the data 104 may be accessed and used in the data characterization process as explained in the next several paragraphs.

FIG. 3 is a flow chart illustrating a process 300 of characterizing a piece of data based on its metadata, in accordance with certain embodiments herein. The process 300 begins with identifying a piece of data for valuation (block 302).

Once a piece of data is selected, metadata of the piece of data is identified (block 304). For example, if the piece of data selected for valuation is an image such as a photograph, the metadata associated with the date of creation of the file, the date of last access and the file size may be accessed.

Then, the piece of data may be characterized based upon the metadata of the piece of data (block 306). For example, if the metadata of the aforementioned photo image file indicates that the date of creation of the file was many years ago, the photo may be characterized as old. In some embodiments, old photographs may be identified as having higher significance to a user than the recently taken ones, thus resulting in older images having a higher value. In some embodiments, subjects of the image may result in different valuation mechanisms. For example, when the image is of a person, older may be more valuable. However, when the image is a coupon, older may not be more valuable (e.g., because the coupon has expired or may be closer to expiring). Thus, one type of metadata that may be acquired is the content/subject matter of the data 104, which may be used to alter how other metadata is used to value the data 104.

Once characterization of a piece of data has occurred, a new piece of data is identified for valuation (block 302) and the process 300 loops until all data 104 is characterized based on its metadata.

Many other value-relevant characteristics may be used to characterize the data 104. FIG. 4 is a flow chart, illustrating a process 400 of characterizing a piece of data based on its rarity, in accordance with certain embodiments described herein. The process 400 begins with identifying a piece of data for valuation (block 402).

As discussed earlier, a search of data sources 112 may be performed to identify whether copies of a piece of data exist in alternate locations (block 404). For example, key attributes of the data 104 may be provided as an input to data source searching tools to identify whether identical and/or derivative copies of the data 104 exist.

Based upon the search, a determination is made as to whether other identical and/or derivative copies of the data 104 exist (decision block 406). In some embodiments, a user may be prompted to provide any known location of copies of the data 104. This may be accomplished via a pop-up on the graphical user interface (GUI) of the covered data storage device 106 or the client device 118, via an email sent to the user, or using the electronic web services.

If identical and/or derivative copies of the data do exist, then the data 104 may be characterized based upon the number of instances of the data 104 and/or locations where it is found (block 408). For example, when numerous copies exist (e.g., over a threshold value) and/or a threshold number of locations store copies of the data, the data 104 may be characterized as common.

If copies of the piece of data do not exist, the piece of data is characterized as rare (block 410). Regardless of whether the data 104 is rare or not, after the characterization step is performed, the process 400 may loop to identify a new piece of data for valuation (block 402) and perform subsequent steps until all the data 104 is characterized based on rarity.

FIG. 5 is a flow chart, illustrating a process 500 of characterizing a piece of data based on a level of protection of the covered data storage device 106, in accordance with certain embodiments described herein. The process 500 begins with identifying a piece of data for valuation (block 502). For example, the piece of data for valuation may be identified based upon being stored on a particular storage device indicated as covered (e.g., by an insurance policy). The particular storage device may be identified based upon Media Access Control (MAC) address, IP address, serial number, or other identifying feature of the particular storage device.

Once the piece of data has been identified, the metadata indicative of the level of protection applied to data 104 on the covered data storage device 106 is accessed (block 504). For example, metadata indicative of the presence of password protection, two-step verification, anti-virus software, exclusive access rights and backup frequency may be accessed. Information on whether a piece of data has been hidden or encrypted by the user may also be accessed. Further, in some embodiments, the metadata might include an indication of particular protection indications of the particular storage device storing the data. Based on such information, the piece of data may be characterized according to its level of protection (block 506).

Well-secured data that is accessible to one or few users may be assigned a lower premium by the data valuation services 102 as it has a lesser chance of being lost or stolen. Further, well-secured data may indicate that the data is more valuable, as care has been taken to protect the data. As mentioned above, once the piece data has been characterized (block 506), a new piece of data (block 502) may be identified to continue the process 500 until all the data 104 has been characterized based on its level of protection.

FIG. 6 is a flow chart of a process 600 of characterizing a piece of data based on the frequency of access and/or interval since last access, in accordance with certain embodiments described herein. The process 600 begins with identifying a piece of data for valuation (block 602). As mentioned above, the piece of data for valuation may be identified based upon being stored on a particular storage device indicated as covered (e.g., by an insurance policy). The particular storage device may be identified based upon Media Access Control (MAC) address, IP address, serial number, or other identifying feature of the particular storage device.

After a piece of data has been identified, metadata indicative of the frequency of access and/or interval since last access is obtained (block 604). Data that is accessed frequently and/or recently may be more valuable to the user. For example, a word document with an essay that a student is preparing for a class will be most valuable as the student is writing and before the essay is submitted. Therefore, the essay document will be valuable if it has been recently accessed. Alternatively, a document that has been accessed multiple times during its existence might contain an important reference or a set of instructions like the covered device user's favorite cake recipe. In this case, frequency of access is likely to be correlated with the document's relative value. In some embodiments, the frequency of access may be considered in light of when the access occurred. For example, frequent access that occurs a threshold amount of time in the past may be characterized as less valuable than frequently accessed data that has recently occurred. Furthermore, in some embodiments, if the frequent access occurs less than a threshold number of times in a range of time window, this may indicate that the data is less valuable than data that is accessed in more than a threshold number of range of time windows.

Thus, after the metadata is accessed, the characterization 116 of the piece of data based upon the frequency of access and/or interval since last access is given (block 606). The process 600 may yield characterizations like "frequently accessed" or "recently accessed" where a threshold time period may determine what is considered frequent and what is considered recent. Following characterization, a new piece of data for valuation is identified (block 602) and the process 600 loops until all the data 104 has been characterized based on frequency of access and/or interval since last access.

FIG. 7 is a flow chart of a process 700 of characterizing using hash functions a set of data based on similarity of its content, in accordance with certain embodiments described herein. The first step in the process 700 is to identify a set of data for valuation (block 702). As mentioned above, the piece of data for valuation may be identified based upon being stored on a particular storage device indicated as covered (e.g., by an insurance policy). The particular storage device may be identified based upon Media Access Control (MAC) address, IP address, serial number, or other identifying feature of the particular storage device.

After a set of data has been identified, hash functions (e.g., locality-sensitive hash functions) may be used to generate hash values (hashes) indicative of how similar the identified data is to other available data. From this indication, sub-sets of data having a threshold level of similarity may be identified (block 704). This step would result in each piece of data in a set getting hash value indicating its similarity.

Then, the set of data may be characterized based upon generated hashes (block 706). This may be done by employing a threshold value to determine similarity. For example, data that is indicated as identical to other data may be seen as less valuable than data that only has a level of similarity to other data. Similarly, data that has a level of similarity to other data may be less valuable than data that is completely unique. Once a set of data has been characterized based on similarity using hash, a new set is identified for characterization (block 702). Thus, the process 700 may loop until all the data 104 has been characterized based on a threshold level of similarity. Moreover, the process 700 may be repeated for various set sizes (e.g., a set of two vs a set of ten) in order to make sure that a similarity group of any size can be found.

The process 700 may be useful in identifying multiple photos belonging to the same scene. For example, photo-takers may take multiple pictures of a scene in an attempt to capture "the best" version of the scene. This might result in a one "best" photo and several redundant photos of the scene, a situation where similar images have different values. To counteract this problem, photos could be indexed with a hash derived from their pixels. The hash could be used to identify photos belonging to the same scene so that the scene may be assigned a single value. Then, in case of a data loss, one payout may be provided for multiple pictures with a threshold level of similarity.

FIG. 8 is a flow chart of a process 800 of valuing data 104 based on its characterizations 116, in accordance with certain embodiments described herein. The process 800 begins with the characterization 116 of data to be valued are received by the data valuation services 102 (block 802). For example, any combination of the characterizations described herein could be received and used.

Next, a valuation model may be applied to the characterizations 116 of data 104 to determine valuations of data 104 (block 804). The valuation model may be a function that takes as an input the characterizations 116 and outputs a valuation (i.e., monetary value). The valuation model may be a machine learning model that aims to provide a monetary value based upon the identified data and the characterizations of the data.

After the valuation model processed the characterization 116, the data valuation services 102 may provide a valuation of the data (block 806). For instance, as discussed earlier, data that has been characterized as rare may be assigned a high valuation, while data that has been characterized as low in originality may be given a low valuation. The valuation may be provided, for example, to a client device 118 via a GUI and/or to downstream electronic services 120.

However, the model may not map characteristics to monetary value perfectly every time. For example, in the case where multiple photos were taken of the same scene, the covered data storage device user may decide that multiple photos are important. In that case, the user might request for the images of the scene to be valued as more than one image. Thus, after providing the valuation of the data, the data valuation services 102 may also provide the user with the ability to request a valuation exception (block 808). The exception request may appear as an application notification, a notice or a message on the graphical user interface (GUI) of the covered data storage device 106 or the client device 118. In addition, the exception request may be sent to the covered data storage device user via on email or presented via the electronic web services 120.

If a valuation exception is requested, then valuation of the excepted data will be updated and flagged (block 810). The flag may indicate that that a valuation exception applies to a piece of data. When requesting a valuation exception, the covered data storage device user might elect for valuation exception to be applied continuously or for valuation exception to expire after a specified period of time. If a valuation exemption expires on a piece or a set of data, that piece or set of data may be unflagged and subject to another valuation.

Once the valuation of the data has been provided and/or updated, the valuation of data is set (block 812). This may involve the valuation of data being stored on a server and/or a cloud. The set valuations may be available for viewing on the client device 118 and/or using the electronic web services 120. As mentioned earlier, the set valuation may be used to reimburse the user in the event of a loss of data.

As mentioned earlier, a determination may be made as to whether a loss of data is likely on the covered data storage device 106. This may be done by characterizing the covered data storage device 106 based on its metadata. FIG. 9 is a flow chart of a process 900 of characterizing the covered data storage device 106 based on its metadata, in accordance with certain embodiments described herein. The process 900 begins with identifying a covered data storage device 106 for characterization (block 902). As mentioned above, data storage device may be identified based upon being indicated as covered (e.g., by an insurance policy). The particular storage device may be identified based upon Media Access Control (MAC) address, IP address, serial number, or other identifying feature of the particular storage device.

After a covered data storage device 106 has been identified, the metadata (e.g., metadata from the operating system) associated with the covered data storage device 106 is accessed to identify whether data storage-loss mitigation factors are present and/or predict outage periods of the device and replacement costs of the data (e.g., costs that would likely occur, given the storage device's configuration, to restore the data to a pre-outage state) (block 904). The data storage-loss mitigation factors may comprise a data backup and/or data distribution on a Redundant Array of Inexpensive Disks (RAID) configuration, for example. In addition, the presence of anti-virus software and/or other security protocols on the covered data storage device 106 may reduce data outage periods and potential replacement costs.

Next, the covered data storage device 106 is characterized based upon its metadata (block 906). This characterization may be facilitated by the data loss evaluation services 108 and involves an assessment of the covered data storage device's 106 likelihood of data loss.

Figure 10:
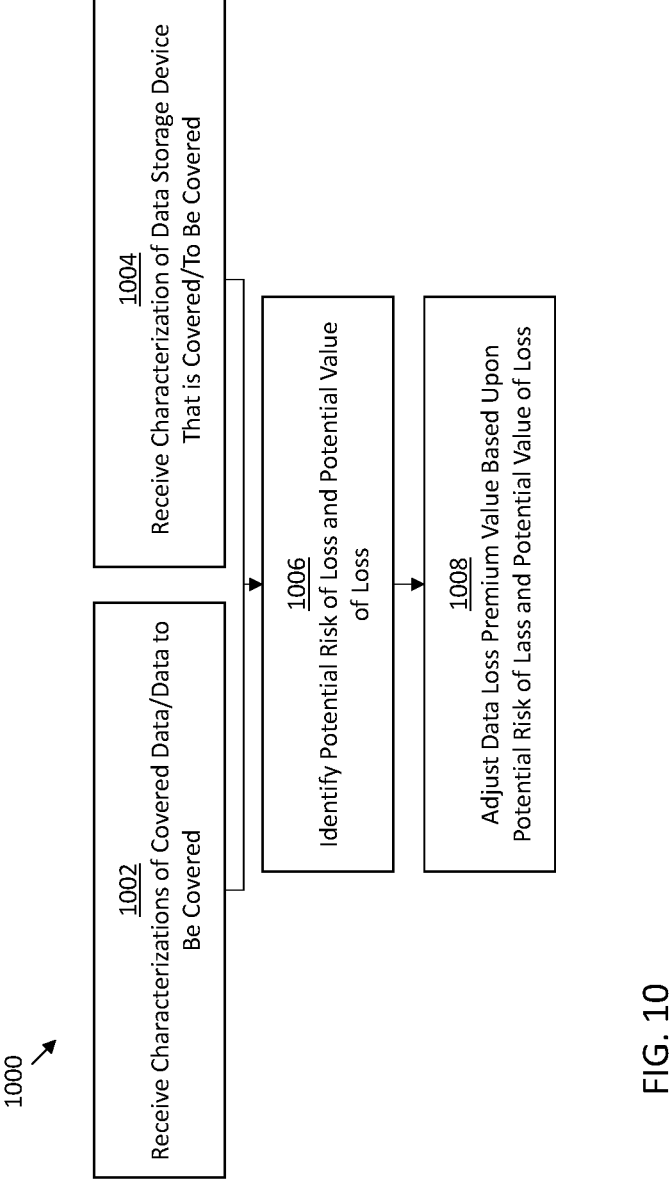
FIG. 10 is a flow chart, illustrating a process of determining a data loss premium, in accordance with certain embodiments described herein.

FIG. 10 is a flow chart of a process 1000 of determining a data loss premium value, in accordance with certain embodiments described herein. The process 1000 begins with receiving a characterization 116 of data that is covered or going to be covered (block 1002) as well as receiving a characterization of the covered storage device that is covered or going to be covered (block 1004). As mentioned above, the characterization 116 of the data 104 may reflect how rare, original, frequently accessed, recently accessed, etc. the data 104 is. Meanwhile, characterization of the covered data storage device 106 may reflect whether data-loss-mitigation factors are present on the covered data storage device 106.

The next step in the process 1000 is to identify a potential risk of loss and potential value of loss (block 1006). The potential risk-of-loss assessment may be based on the characterization of the covered data storage device 106 and facilitated by the data loss evaluation services 108, while the potential value-of-loss assessment may be based on the characterization 116 of the data 104 and facilitated by the data valuation services 102.

Lastly, the data loss premium value is adjusted based upon potential risk of loss and potential value of loss (block 1008). The data loss premium may be paid to the client if the data 104 is lost. Moreover, there may be premiums for individual pieces and sets of data, which may be paid in the event of a partial data loss. The data loss premium information may be provided to the client through the client device 118 or the electronic services 120.

Figure 11:
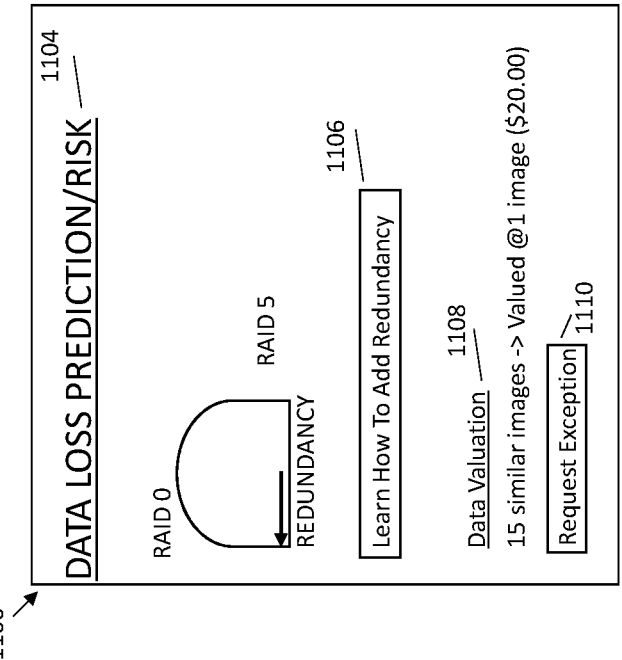
FIG. 11 is a graphical user interface (GUI) visualization, illustrating data loss risk information that may be provided to a covered data storage device user by the data valuation service, in accordance with certain embodiments described herein.

FIG. 11 is a graphical user interface (GUI) visualization 1100 of data loss risk and data valuation information that may be provided to the covered data storage device user or client by the data valuation services 102 and/or the data loss evaluation services 108, in accordance with certain embodiments described herein. The user/client may be able to view this information on the client device 118 using a mobile application, computer program and/or a web browser. The GUI 1100 may include information and/or graphics that indicate data loss prediction/risk 1104. Such graphics may include a representation indicating the redundancy of the data on a scale from RAID 0 to RAID 5. The GUI may also include a button 1106 with a link to resources on how to add redundancy 1106. Resources on how to add redundancy 1106 may include ways to increase RAID, backup data and maintain backup systems. Data valuation information and/or graphics may also be included in the GUI 1100. The recently added data files may appear in the GUI along with their monetary value and a button to request a valuation exception 1110. For instance, if 15 new photographs characterized as belonging to a single scene were added to the covered data storage device 106, then the GUI 1100 may output, "15 similar images valued as 1 image ($20.00)". If there is more than one photograph that the user/client thinks is important, the user/client may request an exception for the group of 15 images to be valued as two or more images.

Figure 12:
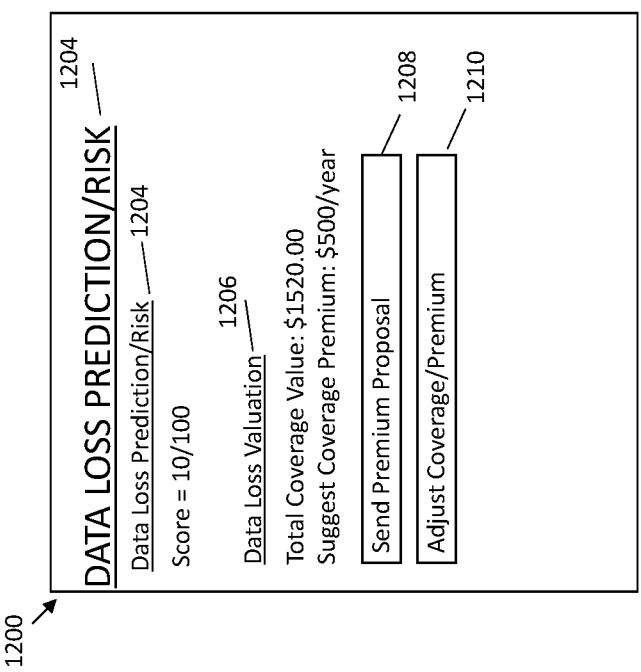
FIG. 12 is a graphical user interface (GUI) visualization, illustrating data value information that may be provided to the covered data storage device user by the data loss evaluation services 108, in accordance with certain embodiments described herein.

FIG. 12 is a graphical user interface (GUI) visualization 1200 of data loss risk and data loss valuation information that may be provided to the covered data storage device user or client by the data valuation services 102 and/or the data loss evaluation services 108, in accordance with certain embodiments described herein. The user/client may be able to view this information online using the electronic services

120 or using a client device 118. The GUI 1200 may include data loss prediction/risk information 1204, which may include a numerical score of the data loss risk (e.g., 10/100) based on the covered data storage device characterization. The GUI 1200 may also include data loss valuation information 1206, which may include the total coverage value for all the data 104 stored on the covered data storage device 106 (e.g., $1520.00) as well as the suggested coverage premium (e.g., $500/yr). Moreover, the GUI 1200 may include buttons to send a premium proposal 1208 and to adjust coverage/premium 1210.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
at least one processor and a memory, that implements a data crawler, configured to:
receive an indication of a data storage device;
in response to receiving the indication of the data storage device:
identify data stored on the data storage device;
traverse the data to accumulate metadata associated with the data comprising: a date of creation of the data, a date of last access of the data, a file size of the data, a subject matter of the data, a presence of password protection to access the data, a multi-step verification to access the data, a presence of antivirus software associated with the data, an encryption of the data, access privileges associated with the data, a backup frequency associated with the data, or any combination thereof;
determine a level of content similarity of the data by using locality sensitive hash functions to generate hash values for each piece of data in respective sets of the data, and identifying content similarity in one or more sub-sets of data of the respective sets of data based on the hash values of the pieces of data in the one or more sub-sets of data surpassing a threshold level of similarity;
identify value-relevant characteristics for the data based upon the metadata and secondary data of at least one secondary data source, the value-relevant characteristics comprising: an indication of a level of protection associated with the data, an indication as to an originality of the data, a the level of content similarity of the data, an indication as to a frequency of access to the data, or any combination thereof;
first computer-implementable instructions that, when executed by one or more processors of a computer, cause the computer to:

identify a characterization of the data, wherein the characterization is based upon the value-relevant characteristics pertaining to the data;

based upon the characterization, determine a monetary value of the data; and provide an indication of the monetary value of the data to a downstream component;

second computer-implementable instructions that, when executed by one or more processors of a computer, cause the computer to:

identify data-loss mitigation factors applied to the data storage device;

based upon the identified data-loss mitigation factors and the monetary value of the data, generate a data-loss characterization comprising, a predicted coverage value for the data, a predicted coverage premium for the data, or any combination thereof; and provide the data-loss characterization to the downstream component.

2. The system of claim 1, wherein the data crawler is configured to:

generate the characterization of the data based upon the value-relevant characteristics pertaining to the data; and provide the characterization of the data to a characterization data store for subsequent use in determining the monetary value of the data.

3. The system of claim 1, wherein:

the data crawler is configured to provide the value-relevant characteristics pertaining to the data to a characterization data store; and the first computer-implementable instructions cause the computer to:

retrieve the value-relevant characteristics pertaining to the data from the characterization data store; and generate the characterization of the data based upon the value-relevant characteristics pertaining to the data.

4. The system of claim 1, wherein the characterization comprises a rarity characterization; and wherein the data crawler is configured to generate the rarity characterization, by:

identifying whether the data exists at the at least one secondary data source; and based upon the data not existing at the at least one secondary data source, characterizing the data as rare.

5. The system of claim 4, wherein the data crawler is configured to generate the rarity characterization, by:

identifying a number of instances of the data existing in the at least one secondary data source; and characterizing a rarity of the data based upon the number of instances.

6. The system of claim 1, wherein the value-relevant characteristics comprise the indication of the level of protection of the data; and the characterization of the data is based upon the level of protection of the data.

7. The system of claim 1, wherein the value-relevant characteristics comprise the indication of the frequency of access to the data; and the characterization of the data is based upon the frequency of access to the data.

8. The system of claim 1, wherein the first computer-implementable instructions cause the computer to:

determine the monetary value of the data, by applying the characterization of the data to a valuation model, wherein the valuation model comprises a machine-learning model that indicates a valuation based upon the characterization of the data.

9. The system of claim 8, wherein the first computer-implementable instructions cause the computer to:

receive an exception request to change the monetary value of the data; and in response to receiving the exception request, change the monetary value of the data and flag the monetary value of the data as an excepted valuation.

10. The system of claim 1, comprising the downstream component, wherein the downstream component comprises an electronic service, configured to:

receive the monetary value of the data;

receive the data-loss characterization; and identify a potential risk of loss and potential value of the loss based upon the monetary value of the data and the data-loss characterization.

11. The system of claim 1, wherein the value-relevant characteristics comprise the level of content similarity of the data.

12. A tangible, non-transitory, computer-readable medium, comprising computer-readable instructions that, when executed by one or more processors of a computer, cause the computer to:

receive an indication of a data storage device; in response to receiving the indication of the data storage device:

identify data stored on the data storage device;

traverse the data to accumulate metadata associated with the data comprising: a date of creation of the data, a date of last access of the data, a file size of the data, a subject matter of the data, a presence of password protection to access the data, a multi-step verification to access the data, a presence of antivirus software associated with the data, an encryption of the data, access privileges associated with the data, a backup frequency associated with the data, or any combination thereof;

determine a level of content similarity of the data by using locality sensitive hash functions to generate hash values for each piece of data in respective sets of the data, and identifying content similarity in one or more sub-sets of data of the respective sets of data based on the hash values of the pieces of data in the one or more sub-sets of data surpassing a threshold level of similarity;

identify value-relevant characteristics for the data based upon the metadata and secondary data of at least one secondary data source, the value-relevant characteristics comprising: an indication of a level of protection associated with the data, an indication as to an originality of the data, the level of content similarity of the data, an indication as to a frequency of access to the data, or any combination thereof;

identify a characterization of the data, wherein the characterization is based upon the value-relevant characteristics pertaining to the data;

based upon the characterization, determine a monetary value of the data; and provide an indication of the monetary value of the data to a downstream component.

13. The tangible, non-transitory, computer-readable medium of claim 12, comprising computer-readable instructions that, when executed by the one or more processors, cause the computer to:

identify and accumulate at least a portion of the value-relevant characteristics pertaining to the data from metadata associated with the data;

13 wherein the value-relevant characteristics comprise the indication of the level of protection of the data, the indication of the frequency of access to the data, or both; and the characterization of the data is based upon the level of protection of the data, the frequency of access to the data, or both.

14. The tangible, non-transitory, computer-readable medium of claim 12, comprising computer-readable instructions that, when executed by the one or more processors cause the computer to:

identify whether the data exists at the at least one secondary data source;

identify a number of instances of the data existing in the at least one secondary data source; and characterize a rarity of the data based upon the number of secondary data sources, the number of instances, or both.

15. The tangible, non-transitory, computer-readable medium of claim 12, comprising computer-readable instructions that, when executed by the one or more processors cause the computer to:

determine the monetary value of the data, by applying the characterization of the data to a valuation model, wherein the valuation model comprises a machine-learning model that indicates a valuation based upon the characterization of the data.

16. The tangible, non-transitory, computer-readable medium of claim 12, comprising computer-readable instructions that, when executed by the one or more processors cause the computer to:

receive an exception request to change the monetary value of the data; and in response to receiving the exception request, change the monetary value of the data and flag the monetary value of the data as an excepted valuation.

17. A computer-implemented method, comprising:

receiving an indication of a data storage device;

in response to receiving the indication of the data storage device:

identifying data stored on the data storage device;

traversing the data to accumulate metadata associated with the data comprising: a date of creation of the data, a date of last access of the data, a file size of the data, a subject matter of the data, a presence of password protection to access the data, a multi-step verification to access the data, a presence of antivirus software associated with the data, an encryption of the data, access privileges associated with the data, a backup frequency associated with the data, or any combination thereof;

determining a level of content similarity of the data by using locality sensitive hash functions to generate hash values for each piece of data in respective sets of the data, and identifying content similarity in one or more sub-sets of data of the respective sets of data based on the hash values of the pieces of data in the one or more sub-sets of data surpassing a threshold level of similarity;

identifying value-relevant characteristics for the data based upon the metadata and secondary data of at least one secondary data source, the value-relevant characteristics comprising: an indication of a level of protection associated with the data, an indication as to an originality of the data, the level of content similarity of the data, an indication as to a frequency of access to the data, or any combination thereof;

identifying a characterization of the data, wherein the characterization is based upon the value-relevant characteristics pertaining to the data;

based upon the characterization, determining a monetary value of the data; and providing an indication of the monetary value of the data to a downstream component.

18. A computer-implemented method of claim 17, comprising:

identifying and accumulating at least a portion of the value-relevant characteristics pertaining to the data from metadata associated with the data, wherein the value-relevant characteristics comprise the indication of the level of protection of the data, the indication of the frequency of access to the data, or both; and characterizing based upon the level of protection of the data, the frequency of access to the data, or both.

19. A computer-implemented method of claim 17, comprising:

determining the monetary value of the data, by applying the characterization of the data to a valuation model, wherein the valuation model comprises a machine-learning model that indicates a valuation based upon the characterization of the data.

20. A computer-implemented method of claim 17, comprising:

receiving an exception request to change the monetary value of the data; and in response to receiving the exception request, changing the monetary value of the data and flagging the monetary value of the data as an excepted valuation.

* * * * *